United States Patent [19]

Smith

[11] Patent Number: 4,642,042
[45] Date of Patent: Feb. 10, 1987

[54] APPARATUS FOR MAKING COMPOSITE SHEETS

[75] Inventor: J. Harold Smith, Amherst, Mass.

[73] Assignee: International Fuel Cells Corporation, South Windsor, Conn.

[21] Appl. No.: 752,691

[22] Filed: Jul. 5, 1985

[51] Int. Cl.$^4$ .............................................. B28B 5/00
[52] U.S. Cl. ................................. 425/364 R; 264/70; 264/72
[58] Field of Search ................. 425/364 R, 373, 374, 425/4 C, 80.1, 817 C, 406, 456; 264/70, 69, 71, 72, 108, 109, 120

[56] References Cited

U.S. PATENT DOCUMENTS

| | | | |
|---|---|---|---|
| 2,509,354 | 5/1950 | Jones et al. | 425/364 X |
| 2,678,081 | 5/1954 | Rainard et al. | 425/364 X |
| 2,759,435 | 8/1956 | Krawczak | 425/364 X |
| 3,158,474 | 11/1964 | Andersen et al. | 425/364 X |
| 3,227,590 | 1/1966 | Kurz | 156/73.6 |
| 3,260,635 | 7/1966 | Page et al. | 264/70 X |
| 3,423,492 | 1/1969 | Jonell et al. | 264/70 |
| 3,431,595 | 3/1969 | Plum et al. | 425/364 |
| 3,608,003 | 9/1971 | Klaue et al. | 264/70 X |
| 3,608,012 | 9/1971 | Jonell et al. | 264/70 |
| 3,811,976 | 5/1974 | Schlomer et al. | 156/62.8 |
| 4,079,109 | 3/1978 | Helmrich et al. | 264/72 |
| 4,379,729 | 4/1983 | Cross | 156/73.6 |
| 4,426,340 | 1/1984 | Goller et al. | 264/29.1 |
| 4,432,717 | 2/1984 | Viemon | 264/70 X |
| 4,450,022 | 5/1984 | Galer | 264/7 X |

FOREIGN PATENT DOCUMENTS

| | | | |
|---|---|---|---|
| 451581 | 10/1927 | Fed. Rep. of Germany | 425/364 |
| 1034431 | 6/1966 | United Kingdom . | |

Primary Examiner—Richard L. Chiesa
Attorney, Agent, or Firm—A. Dean Olson

[57] ABSTRACT

An apparatus for making composite sheets that are homogeneous, dense, and have an even surface. The apparatus comprises an oscillating plate unit that vibrates in a direction transverse to a belt means. Composite pre-mix is deposited on the conveyor belt which draws it under the oscillating plate. The oscillating plate has three sections: a curved plate section; an inclined plate section and a flat plate section. The composite pre-mix is metered by the curved plate section, compacted by the inclined plate section and maintained compacted by the flat plate section. These thus formed composite sheets may be cured and are particularly adapted for use in fuel cell structures such as electrode substrates.

10 Claims, 5 Drawing Figures

APPARATUS FOR MAKING COMPOSITE SHEETS

TECHNICAL FIELD

This invention relates to an apparatus and method for making composite sheets, particularly adapted for use in fuel cells.

BACKGROUND ART

Several different devices have been utilized in the production of fuel cell structures such as electrode substrates and separator plates. One apparatus utilizes a roller and a conveyer belt to form composite mixtures into composite substrates. A composite mixture is deposited upon the conveyer belt and is fed underneath the roller which turns continually in an opposite direction to that of the conveyor belt. This process meters and compacts the composite mix. However, this method is characterized by voids, cracks, inhomogeneities and other imperfections that appear in the finished composite sheet. In addition to a localized reduction in strength and incipient crack formation, these defects cause reduced cell performance, specifically they result in, for example, diffusion differences, acid transfer problems and maldistribution of gas flows. These defects are especially apparent when the composites are comprised of fibrous mixtures having long length fibers.

When long length fibers are combined with resin, heated and cured, the resins will bind the fibers into an interlocking matrix which has the strength, rigidity, porosity and other properties needed in fuel cell structures. However, the very properties which the fibers impart to the finished fuel cell structure cause them to interlock, form aggregates, and resist movement during handling of the dry fiber/powder mixtures. This causes difficulty in depositing the fibrous mixtures into molds, or even onto flat plates in the production of fuel cell structures.

Accordingly, there is a constant search in this art for apparatuses and methods for making composite sheets which overcome such problems.

DISCLOSURE OF INVENTION

This disclosure is directed to an apparatus for making a composite sheet that is smooth surfaced, homogeneous, dense and particularly adapted for use in fuel cell structures such as electrode substrates. The apparatus comprises a movable belt means and a metering member that is separated from the belt means by a distance at least equal to a predetermined final thickness of the composite sheet. The metering member is capable of vibration in a direction transverse to the belt means. The metering member comprises three contiguous plate sections with the first being a curved plate section that is at its closest point to the belt less than about 120 percent (%) of the thickness of the predetermined final thickness of the composite sheet. The second plate section is an inclined plate section which is contiguous to the curved plate section at the above-identified closest point. The inclined plate section slopes towards the belt from the curved plate section to a second point which is separated from the belt means by a distance substantially equal to the predetermined final thickness of the composite sheet. The third plate section is a flat plate section which is contiguous to the inclined plate section at the above-mentioned second point. The flat plate section is both parallel to the belt means and separated from the belt means by a distance which is substantially equal to the predetermined final thickness of the composite sheet.

Another aspect of this invention is a method for making a dense composite sheet which has a smooth even surface and is uniform and homogeneous in consistency. Composite premix is deposited on a moving belt and is then metered while the premix is vibrated. Then the composite premix layer is compacted while the premix layer is continually vibrated. Next, the composite premix layer is maintained in its compacted form while it is continually vibrated. The composite premix layer is cured in this compacted form and results in a homogeneous composite sheet that is both smooth surfaced and dense.

This discovery makes a significant advancement in the fuel cell art. It provides technology for the manufacturing of composite sheets that have the properties, such as density, most required in fuel cell structures, particularly electrode substrates.

Other features and advantages will be apparent from the specification and claims and from the accompanying drawings illustrating an embodiment of the invention.

BEST MODE FOR CARRYING OUT THE INVENTION

Figure 1:
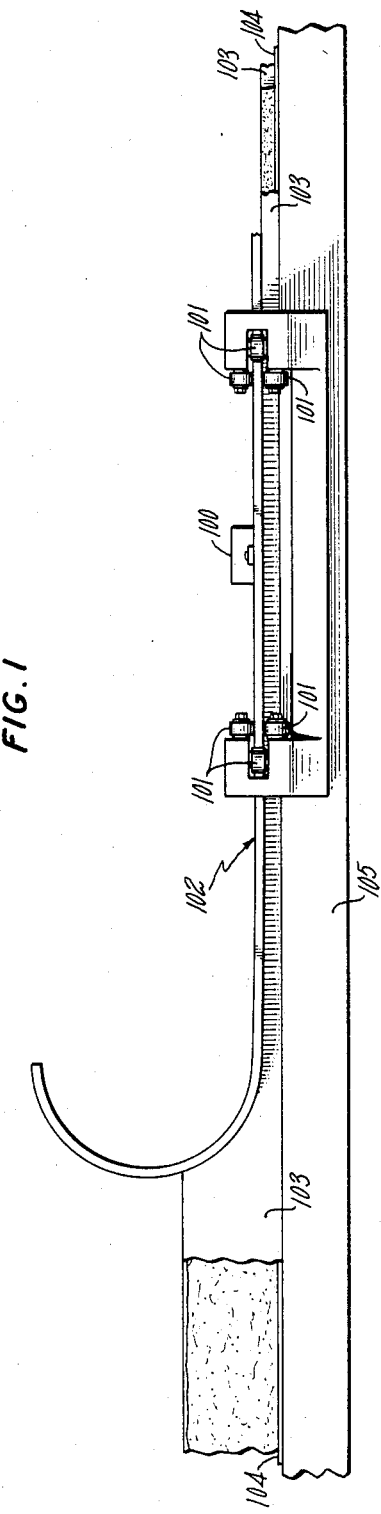
FIG. 1 is a side view of an apparatus for producing composite sheet material.
Figure 2:
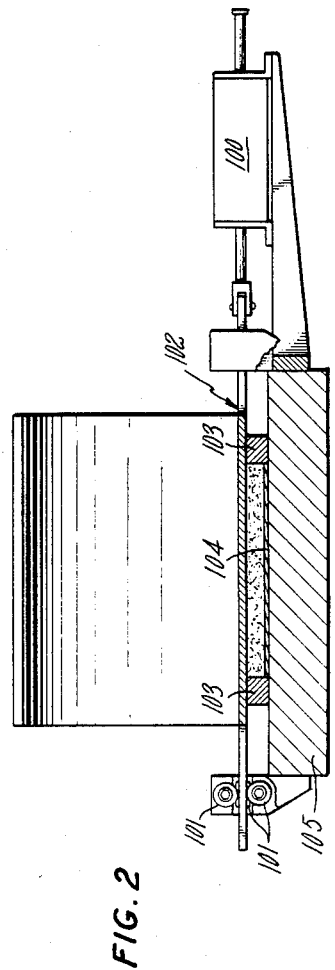
FIG. 2 is a right side view of FIG. 1 partly broken away and partly in section.
Figure 3:
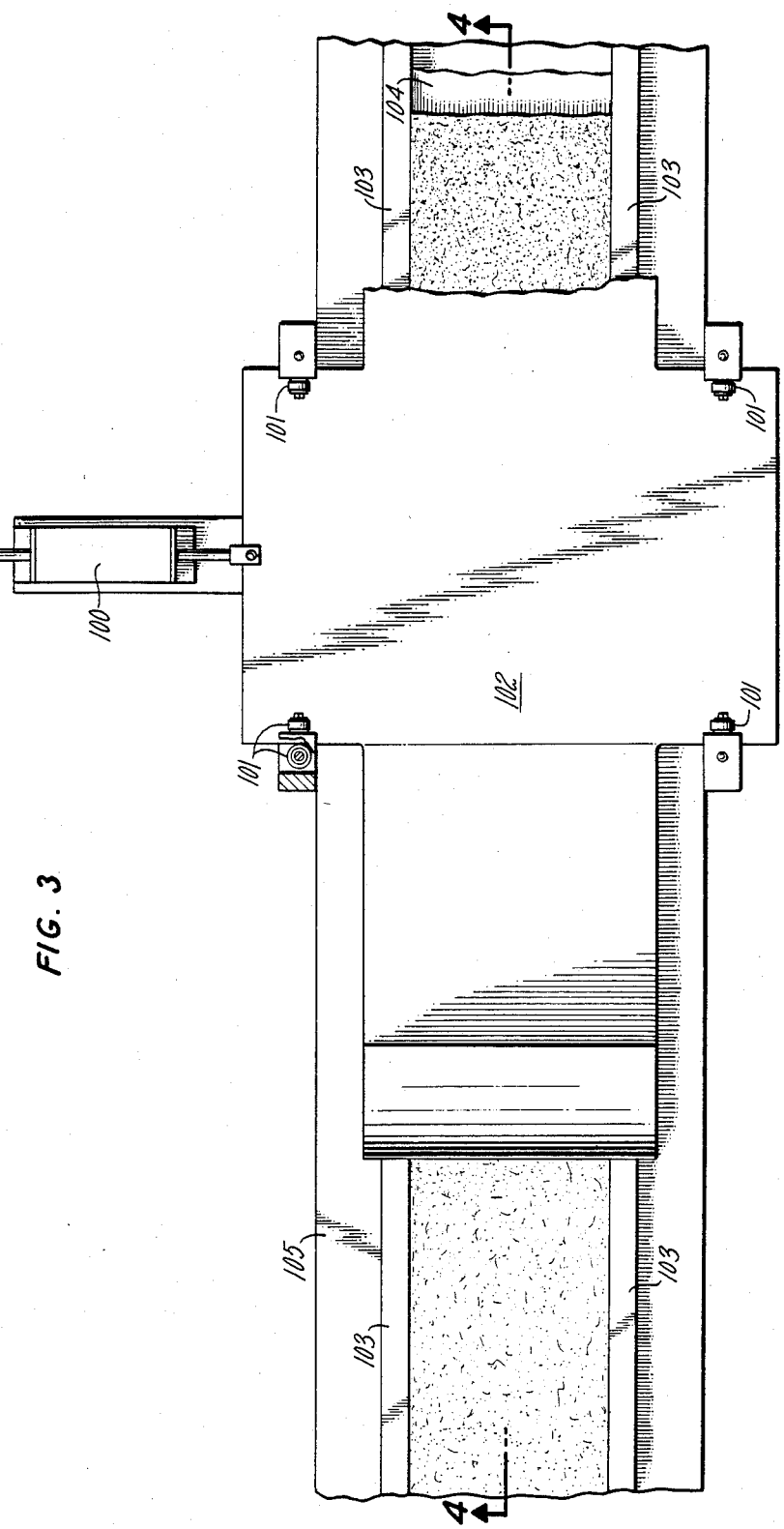
FIG. 3 is a top view of FIG. 1 partly broken away and partly in section.

A clear understanding of this discovery may be had by reference to the figures. In FIGS. 1-3 a linear actuator 100 is utilized which is capable of imparting oscillating movement to a plate 102. A planar portion of the plate 102 is positioned between rollers 101 which support and guide plate 102 in its oscillating movement. Any conventional apparatus that is capable of imparting an oscillating movement of about 100-1200 cycles per minute to the plate may be utilized in place of the above-described apparatus such as a commonly available jigsaw unit which would be connected to the plate 102.

Any material that can provide the desired compaction, withstand the vibrational forces without buckling or warping, and impart a smooth surface to the composite sheet may be used to fashion the oscillating plate 102. It is preferred that the oscillating plate 102 is comprised of lightweight metals or alloys such as aluminum or magnesium, and especially preferred that aluminum is used in the practice of this invention. A lightweight plate is easier to oscillate at the frequencies practiced in the invention and if required conventional reinforcing supports can be added to keep the plate rigid and planar without adding significant weight. For fuel cell component construction the oscillating plate typically has dimensions of 36.5 by 36.5 by about 0.0625 inches.

The oscillating plate 102 rests on shims 103 and rollers 101 which are positioned on either side of a moving conveyer belt means 104 such as a conventional conveyor belt which is positioned between the oscillating plate 102 and a base 105.

The thickness of the shims at the exit end is substantially equal to the thickness of the conveyor belt means and the predetermined final thickness of the composite sheet which for fuel cell applications is typically about 0.1 inch. By predetermined final thickness of the composite sheet is meant the final thickness of the composite sheet desired by the manufacturer producer. It is typically necessary to make an allowance for shrinkage of the composite sheet which occurs during curing. It may also be necessary to make an allowance for any machining of the composite sheet such as the machining of ribs etc. These allowances vary according to the material used and the desired shape of the product and the determination of these allowances is conventional in this art. It may be essential to use a rather heavy and rigid belt such as a fiber reinforced silicon belt to convey the powder under the oscillating plate unit if the powder layer is to be highly compacted. Thus as a conventional conveyor belt means 104 moves along, the above-described linear actuator 100 provides the oscillating plate 102 with a vibratory motion in a direction transverse to the conveyor belt means 104.

Figure 4:
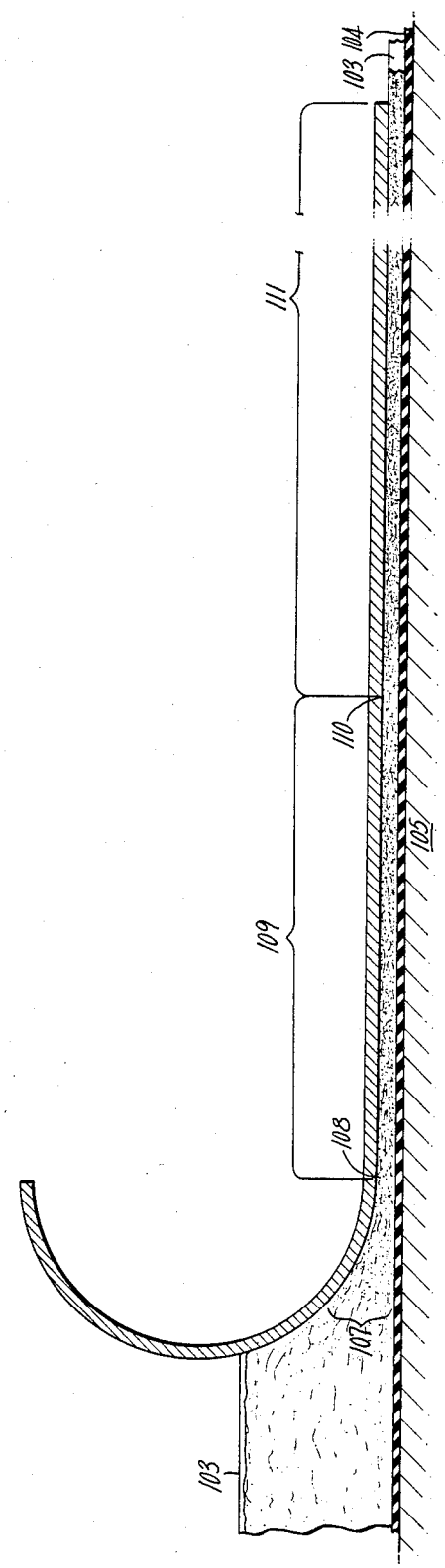
FIG. 4 is a sectional view taken along line 4—4 of FIG. 3 with the oscillating means and associated support structure removed for clarity.

FIG. 4 represents a sectional view of the oscillating plate and conveyer belt means described above. In FIG. 4 the composite premix is deposited on the conveyer belt 104 in the area in front of the oscillating plate 102. The oscillating plate 102 has three sections described as follows. In the metering region 107, the composite premix, which was deposited in the area in front of the oscillating plate 102, is metered underneath a curved plate section which gives the desired initial compression to the product while at the same time determining (or "metering") the amount of fibrous material to be incorporated into the fibrous mat. At its closest point 108 to the belt 104 the curved plate section is less than 120% the thickness of the predetermined final thickness of the composite sheet. Curve refers to the bending of a line from a rectilinear direction. The curve may take many forms such as a quarter-round, an ellipse shape, etc. Different curvatures are appropriate for different composite mixes. For example, larger diameter circular metering regions may be used advantageously to deposit long fiber blends which are particularly difficult to handle. This is because higher pressures are created if larger curves are used. Thus, a 6.5 inch diameter roll provides good metering and compaction for mixtures containing fibers that are approximately 0.01 inch long. Smaller 2 inch diameter curves provide good action when the mixtures comprise fibers that are approximately 0.002 inch to 0.010 inch in length.

The composite premix is metered as the conveyer belt 104 pulls the premix underneath the oscillating plate. The frequency and amplitude of the back and forth oscillations of the plate are adjusted to optimize the working action as evidenced by the quality of the product being produced. Frequencies are typically in the 100–1200 cycle per minute range, but may be increased some if very fast belt speeds are being used. Amplitudes are generally in the 0.1–2.0 inch range, but may be even shorter if the frequency is higher (and conversely).

Passage under the curved section of the oscillating plate compresses the fibrous mass increasingly as the curvature angle relative to the belt flattens from 90° to 0°. Near the point where the curvature angle reaches 0°, the initial compression phase is complete and "metering" occurs, i.e., the amount of fibrous mixture which is to be fed or metered under the oscillating plate is determined or fixed. Thus the material in the reservoir of fibrous mixture deposited in front of the oscillating plate is worked and compacted as it moves beneath the curved section of the rapidly oscillating plate. There is holdup in this bottleneck section until adequate compaction, packing and perfection of the deposit has been achieved. At a given region the deposit reaches the point of no return, i.e., holdup has ended and passage under the flatter section of the oscillating plate unit begins.

In the next oscillating plate section 109, compaction occurs. This inclined plate section is contiguous to the metering region plate section along a line at the above-described first closest point 108. It slopes from the curved plate section towards the belt to a second point 110 which is separated from the belt by a distance substantially equal to the predetermined final thickness of the composite sheet. The slope can either be a straight line or a curve, however a curved plate section is preferred as it achieves superior compaction. Compaction is easiest at the beginning of the slope and a curved plate can be provided with a steep slope at that point in order to achieve maximum packing at the start. In this region the composite premix, which has been formed into a layer by being metered in the metering region, is continually vibrated.

The final oscillating plate section comprises a region where the composite premix layer is maintained or consolidated in its compacted form by the maintenance section 111. This flat plate section is contiguous to the inclined plate section along a line at the above-identified second point 110 and is parallel to the belt means. It is separated from the belt means by a distance substantially equal to the predetermined final thickness of the composite sheet. In this section, vibration of the compacted composite premix continues, resulting in further settling of the composite premix and resistance to springback of the fibrous material.

The three plate sections may vary in size with the application. However typically, the lengths are in the proportion: metering section 15; compaction section 30; and maintenance section 55. The compaction and maintainance sections provide preferable processing when they are of these comparative lengths as the working area is long enough to achieve its function. In fuel cell applications, specifically the making of electrode substrates, the preferred lengths are about: metering section 5.5 inches; compaction section 11 inches; and maintenance section 20 inches.

The composite premix layer once compacted may be cured. Curing is accomplished typically using radiant heat such as that supplied by a quartz lamp oven available from Thermatronics Inc. Curing temperatures are typically about 300° F. to about 375° F. but preferably about 350° F., however they can vary depending on the materials, particularly the resin used. Curing times depend on the temperature and materials used but are typically about 1 minute to about 4 minutes preferably about 2 minutes to about 3 minutes.

Figure 5:
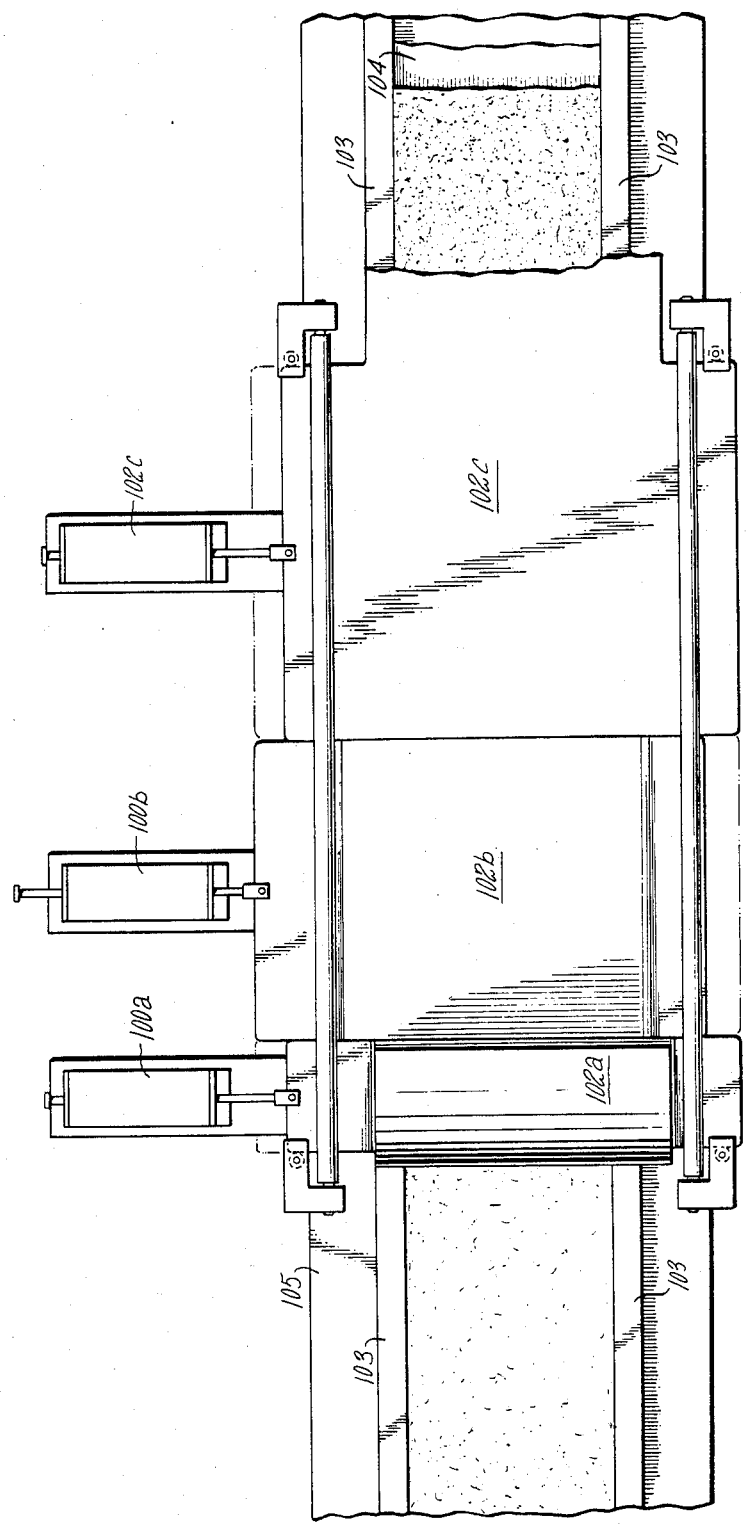
FIG. 5 is a top view similar to FIG. 3 of an apparatus for producing composite sheet material wherein the plate sections oscillate in opposite directions.

Although this apparatus and method has been described in terms of a single plate having different regions, the oscillating plate could be divided up in sections that oscillate in opposite directions at the same time. As shown in FIG. 5, there is means for oscillating the plate sections in opposite directions, such as a plurality of linear actuation units 100a, 100b and 100c connected to the plate sections 102a, 102b and 102c. This action would offset the tendency of the product and belt to shift. This may be needed when very high pressures are being exerted in the working action area such as when high density products or those being produced from long fibers are being made. In addition, oscillating plates of special types can be used to deposit edge seals, as well as rib and web sections of the substrates. Partitions may be positioned ahead of the oscillating plate to divide the reservoir into edge seal and rib sections.

This apparatus can also be used to fill indentations in existing composite sheets. Rib cuts, and other molds of many types and plates, belts, drums, rolls, etc., can be filled effectively with properly designed oscillating plate methods and devices. Partition may be required if two or more types of fibrous material are to be deposited.

There are a variety of fibers that can be used in the practice of this invention such as glass fibers, wood fibers, and cotton fibers, preferably carbon fibers. Typical fiber lengths are about 0.001 inch to about 0.125. The fibers are usually about 8 micron ($\mu$) to about 20$\mu$ in diameter. There is also a variety of resins that can be used in this invention such as polyethylene, polyvinyl chloride, urea formaldehyde and phenol resins, preferably phenol formaldehyde such as Varcum 24-655 TM resin (Reichhold Chemical Co., New Jersey). Typically the resin is used in powder form such that the powder particle sizes are such that about 98% to about 100% of the particles in a given lot will pass through a 200 mesh screen. The ratio of fiber to resin is usually about 70 to about 30 but may vary depending on the desired properties of the end product.

EXAMPLE

A 70/30 mixture of 0.005 inch long graphite fibers and Varcum 24-655 resin was deposited on a conveyor belt moving at 5 feet per minute. The fiber/resin premix deposit was metered, compacted and maintained by an oscillating plate whose oscillating frequency was 300 cycles per minute and had an amplitude of 0.68 inch. The oscillating plate was 3.25 inches wide and had a 2 inch diameter semicircular metering region contiguous to a 21 inch flat plate section. The metering region was separated from the belt by 0.138 inch and the flat plate section was separated from the belt by 0.125 inch. The composite sheet emerged from the oscillating plate unit at a thickness of 0.125 inch and was cured in an infrared sintering oven at about 340° F. for a period of 3.5 minutes. Visual inspection confirmed that the plate was homogeneous in consistency.

This apparatus is effective in producing conventional fuel cell structures such as electrode substrates and separator plates. However, even more complex fuel cell structures such as parts containing internal manifolds can be formed using this technology.

Although this disclosure has been primarily directed to the production of composite sheets for fuel cell structures, this apparatus and method could be utilized in the production of composite sheets for other uses such as in the building industry, paper industry, particle board industry, etc.

This discovery provides an apparatus and method for making composite sheets that are both uniform, dense and have an even smooth surface. This apparatus creates a vibratory or working action which breaks down the clumps, aggregates, balls and other interlocking structures which tend to form or build up in the fibrous mixtures. The objective is to break down any aggregates or interlocking structures to give individual fibers and powder particles. Such a relatively free flowing fibrous mixture tends to fill a mold evenly and uniformly with a minimum of gaps, voids, inhomogeneities, or other defects. Complete filling and uniform packing of the fibrous mixture into all regions and recesses of the mold cavities is accomplished only if there is considerable working action such as can be achieved by the use of an oscillating plate. Previous roll knifing methods described in the background art section were ineffectual with long fiber blends because the working action region was far too short. The dwell time in the working action zone was extremely short, i.e., just the instant that the fibrous mixture was directed under the roll. This resulted in voids, cracks, low density areas, inhomogeneities and other defects in roll knife process products.

By contrast, the back and forth working action, which occurs over a considerable dwell time as the composite pre-mix passes beneath the oscillating plate is most effective in eliminating voids, inhomogeneities or other defects. This working action tends to reform the fibrous mixture into interlocking aggregates or fibers which have the shape and size of the mold cavity. Thus the mold deposit is strengthened and stabilized to retain the shape of the molded structure. These dense uniform smooth surface structures are required in fuel cell technology to provide a reliable support for electrode constituents and enable consistent cell to cell performance. This apparatus makes a significant advancement in fuel cell technology by providing an apparatus for the production of dense, uniform, even surfaced, fuel cell components.

It should be understood that the invention is not limited to the particular embodiments shown and described herein, but that various changes and modifications may be made without departing from the spirit and scope of this novel concept as defined by the following claims.

I claim:

1. A fuel cell manufacturing apparatus for making composite sheets comprising a movable belt means and a metering member that is separated from the belt means by a distance at least equal to a predetermined final thickness of the composite sheet, said metering member particularly adapted to vibration in a direction transverse to the belt means, the metering member comprising:

(a) a curved plate section that is at its closest point to the belt less than 120% of the thickness of the predetermined final thickness;

(b) an inclined plate section, contiguous to said curved plate section at said closest point, wherein the inclined plate section slopes towards the belt from the curved plate section to a second point which is separated from the belt means by a distance substantially equal to the predetermined final thickness of the composite sheet;

(c) a flat plate section contiguous to said inclined plate section at said second point, wherein said flat plate section is both parallel to the belt means and separated from the belt means by a distance substantially equal to the predetermined final thickness of the composite sheet;

(d) said metering member sections capable of oscillating in opposite directions transverse to the belt means; and (e) means for oscillating said metering member sections.

2. The apparatus for making fuel cell composite sheets as recited in claim 1 wherein the metering member is about 36.5 inches by about 36.5 inches by about 0.0625 inch.

3. The apparatus for making fuel cell composite sheets as recited in claim 1 wherein the curved plate section is about 2 inches in diameter.

4. The apparatus for making fuel cell composite sheets as recited in claim 1 wherein the curved plate section is about 6.5 inches in diameter.

5. The apparatus for making fuel cell composite sheets as recited in claim 1 wherein said metering member is capable of vibrating at a frequency of about 100 to about 1200 cycles per minute.

6. The apparatus for making fuel cell composite sheets as recited in claim 1 wherein the metering member is capable of vibrating at an amplitude of about 0.1 to about 2 inches.

7. The apparatus for making fuel cell composite sheets as recited in claim 1 wherein the inclined plate section is curved.

8. The apparatus for making fuel cell composite sheets as recited in claim 1 wherein the inclined plate section is curved having its steepest curvature at the beginning of said curve.

9. The apparatus for making fuel cell composite sheets as recited in claim 1 wherein the curved plate section is about 15%, the inclined section is about 30% and the flat plate section is about 55% of the length of said metering member.

10. The apparatus for making fuel cell composite sheets as recited in claim 1 wherein the curved plate section length is about 5.5 inches, the inclined plate section length is about 11 inches and the flat plate section length is about 20 inches.

* * * * *